United States Patent
Hannan et al.

(10) Patent No.: US 9,778,371 B2
(45) Date of Patent: Oct. 3, 2017

(54) AUTONOMOUS TRANSMIT CHAIN DELAY MEASUREMENTS

(71) Applicant: CommScope Technologies LLC, Hickory, NC (US)

(72) Inventors: Ariful Hannan, Sterling, VA (US); Khalid W. Al-Mufti, Sterling, VA (US); Tariqul Islam, Germantown, MD (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/242,272

(22) Filed: Aug. 19, 2016

(65) Prior Publication Data

US 2017/0045625 A1 Feb. 16, 2017

Related U.S. Application Data

(62) Division of application No. 13/740,643, filed on Jan. 14, 2013, now Pat. No. 9,423,508.

(60) Provisional application No. 61/585,681, filed on Jan. 12, 2012.

(51) Int. Cl.
  *G01S 19/46* (2010.01)
  *G01S 19/38* (2010.01)
  *G01S 5/02* (2010.01)
  *G01S 5/10* (2006.01)

(52) U.S. Cl.
  CPC ............ *G01S 19/46* (2013.01); *G01S 5/021* (2013.01); *G01S 5/10* (2013.01)

(58) Field of Classification Search
  CPC .................................. G01S 19/09; G01S 19/46
  USPC .............. 342/355.21, 357.25, 357.29, 357.4; 701/468, 469
  See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney et al. |
| 4,814,751 A | 3/1989 | Hawkins et al. |
| 4,845,504 A | 7/1989 | Roberts et al. |

(Continued)

FOREIGN PATENT DOCUMENTS

| | | |
|---|---|---|
| JP | 06347529 | 12/1994 |
| WO | 2006088472 | 8/2006 |

OTHER PUBLICATIONS

US Patent Office, "Notice of Allowance", "from U.S. Appl. No. 13/740,643", Apr. 21, 2016, pp. 1-7, Published in: US.

(Continued)

*Primary Examiner* — Dao Phan
(74) *Attorney, Agent, or Firm* — Fogg & Powers LLC (57) ABSTRACT

A system and method for determining transmission delay in a communications system. In some embodiments, satellite positioning information having System Frame Number (SFN) information may be received for a mobile device and observed time difference of arrival (OTDOA) measurements may be received for a mobile device. A location of the mobile device may be determined as a function of the received satellite positioning information. A Global Positioning System (GPS) time estimate may be determined as a function of the determined location of the mobile device. Transmission delay between a node serving the mobile device and an antenna serving the mobile device may be determined as a function of the received OTDOA measurements and determined GPS time estimate.

9 Claims, 8 Drawing Sheets

(56) References Cited

U.S. PATENT DOCUMENTS

| | | |
|---|---|---|
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy, Jr. |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy, Jr. |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost et al. |
| 6,014,102 A | 1/2000 | Mitzlaff et al. |
| 6,047,192 A | 4/2000 | Maloney et al. |
| 6,091,362 A | 7/2000 | Stilp et al. |
| 6,097,336 A | 8/2000 | Stilp |
| 6,097,959 A | 8/2000 | Yost et al. |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,236,359 B1 | 5/2001 | Watters et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack et al. |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson et al. |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney et al. |
| 6,553,322 B1 | 4/2003 | Ignagni |
| 6,563,460 B2 | 5/2003 | Stilp et al. |
| 6,571,082 B1 | 5/2003 | Rahman et al. |
| 6,603,428 B2 | 8/2003 | Stilp |
| 6,603,761 B1 | 8/2003 | Wang et al. |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy et al. |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson et al. |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney et al. |
| 7,427,952 B2 | 9/2008 | Bull et al. |
| 7,440,762 B2 | 10/2008 | Maloney et al. |
| 7,593,738 B2 | 9/2009 | Anderson |
| 2002/0172223 A1 | 11/2002 | Stilp |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy et al. |
| 2004/0132466 A1 | 7/2004 | Kennedy, Jr. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Alles et al. |
| 2007/0111746 A1 | 5/2007 | Anderson |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson |
| 2008/0132247 A1 | 6/2008 | Anderson |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Anderson et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

OTHER PUBLICATIONS

US Patent Office, "Ex Parte Quayle Action", "from U.S. Appl. No. 13/740,643", Nov. 16, 2015, pp. 1-34, Published in: US.

US Patent Office, "Restriction Requirement", "from U.S. Appl. No. 13/740,643", Jul. 14, 2015, pp. 1-6, Published in: US.

(56) References Cited

OTHER PUBLICATIONS

N. Agarwal et al., "Capacity Analysis of the GSM Short Message Service", "Indian Institute of Technology Bombay", "Jan. 2004", pp. 1-5.
J.D Bard et al., "Time Difference of Arrival Dilution of Precision and Applications", "IEEE Transactions on Signal Processing", Feb. 1999, pp. 521-523, vol. 47, No. 2, Publisher: IEEE.
Caffery et al., "Overview of Radiolocation in CDMA Cellular System", "Communications Magazine", "Apr. 1998", pp. 38-45, vol. 36, No. 4, Publisher: IEEE.
J. Caffery Jr et al., "Subscriber Location in CDMA Cellular Networks", "IEEE Transactions on Vehicular Technology", "May 1998", pp. 406-416, vol. 47, No. 2, Publisher: IEEE.
J. Caffery Jr, "A New Approach to the Geometry of TOA Location", "IEEE", "VTC 2000", pp. 1943-1949, Publisher: IEEE.
Y.T. Chan et al., "A Simple and Efficient Estimator for Hyperbolic Location", "IEEE Transactions Signal Processing", "Aug. 1994", pp. 1905-1915, vol. 42, No. 8, Publisher: IEEE.
Y. Chen et al., "Joint Angle and Delay Estimation for DS-CDMA with Application to Reduced Dimension Space-Time Rake Receivers", "Mar. 1999", pp. 2933-2936, Publisher: IEEE.
P.C. Chen, "A Non-Line-of-Sight Error Mitigation Algorithm in Location Estimation", "IEEE Conference on Wireless communications Networking", "Sep. 1999", pp. 316-320, vol. 1, Publisher: IEEE.
L. Cong et al., "Non-Line-of-Sight Error Mitigation in TDOA Mobile Location", "IEEE Global Telecommunications conference", "Sep. 2001", pp. 680-684, vol. 1, Publisher: IEEE.
G.W.K. Colman, "A Comparison of the Accuracy of TDOA and TOA Location Algorithms with Equivalent Receiver Geometry", "Defence R&D Canada Technical Memorandum", "Oct. 2001", pp. 1-53.
Drane et al., "Positioning GSM Telephones", "IEEE Communication Magazine", "Apr. 1998", pp. 46-54,59, Publisher: IEEE.
W.H. Foy, "Position-Location Solutions by Taylor-Series Estimation", "IEEE Transactions on Aerospace and Electronic Systems", "Mar. 1976", pp. 187-194, vol. AES 12, No. 2, Publisher: IEEE.
M. Haardt et al., "Joint Estimation of 2-D Arrival Angles, Propagation Delays, and Doppler Frequencies in Wireless Communications", "IEEE Digital Signal Processing Workshop, Bryce Canyon National Park, Utah", "Aug. 1998", pp. 1-4, vol. 1, Publisher: IEEE.
K.C.Ho et al., "An Accurate Algebraic Solution for Moving Source Location Using TDOA and FDOA Measurements", "IEEE Transaction on Signal Processing", "Sep. 2004", pp. 2453-2463, vol. 52, No. 9, Publisher: IEEE.
C.H. Knapp et al., "The Generalization Correlation Method for Estimation of Time Delay", "IEEE Transaction on Acoustics, Speech, and Signal Processing", "Aug. 1976", pp. 320-327, vol. ASSP 24, No. 4, Publisher: IEEE.
A. Leshem et al., "Array Calibration in the Presence of Multipath", "IEEE Transactions on Signal Processing", "Jan. 2000", pp. 53-59, vol. 48, No. 1, Publisher: IEEE.
L. Mailaender, "On the Geolocation Bounds for Round-Trip Time-of-Arrival and All Non-Line-of-Sight Channels", "Journal on Advances in Signaling Processing", "2008", pp. 1-10, Publisher: EURASIP.
C.B. Papadias, "Space-Time Signal Processing for Wireless Communication: A Survey", "Information Systems Laboratory, Stanford University", "Apr. 16-18, 1997", pp. 1-4.
A.J. Paulraj et al., "Space-Time Processing for Wireless Communications", "IEEE Signal Processing Magazine", "Nov. 1997", pp. 49-83, vol. 11, Publisher: IEEE.
M. Rahnema, "Overview of the GSM System and Protocol Architecture", "IEEE Communication Magazine", "Apr. 1993", pp. 92-100, Publisher: IEEE.
Rappaport et al., "Position Location Using Wireless Communications on Highways of the Future", "Communication Magazine", "Oct. 1996", pp. 33-41, vol. 34, No. 10, Publisher: IEEE.
R. Schmidt, "Multiple Emitter Location and Signal Parameter Estimation", "IEEE Transactions on Antennas and Propagation", "Mar. 1986", pp. 276-280, vol. AP 34, No. 3, Publisher: IEEE.
M. Silventoinen et al., "Mobile Station Emergency Locating in GSM", "IEEE International Conference, Personal Wireless Communications", "1996", pp. 232-238, vol. 1, Publisher: IEEE.
R.G. Stansfield, "Statistical Theory of DF Fixing", "IEEE Journal 94, Part III A", "Oct. 1947", pp. 762-770, Publisher: IEEE.
S. Stein, "Algorithms for Ambiguity Function Processing", "IEEE Transactions on Acoustics, Speech, and Signal Processing", "Jun. 1981", pp. 588-599, vol. ASSP 29, No. 3, Publisher: IEEE.
N.J. Thomas et al., "Performace of a TDOA-AOA Hybrid Mobile Location System", "3G Mobile Communication Technologies", "Mar. 2001", pp. 216-220, No. 477.
D.J. Torrieri, "Statistical Theory of Passive Location Systems", "IEEE Transactions on Aerospace and Electronic Systems", "Mar. 1984", pp. 183-198, vol. AES 20, No. 2, Publisher: IEEE.
M. Vanderveen et al., "Joint Angle and Delay Estimation (JADE) for Multipath Signals Arriving at an Antenna Array", "IEEE Communications Letters", "Jan. 1997", pp. 12-14, vol. 1, No. 1, Publisher: IEEE.
Xin Wang et al., "A TOA-Based Location Algorithm Reducing the Errors Due to Non-Line-of-Sight (NLOS) Propagation", "IEEE Transactions on Vehicular Technology", "Jan. 2003", pp. 112-116, vol. 52, No. 1, Publisher: IEEE.
M. Wax, "Position Location from Sensors with Position Uncertainty", "IEEE Transactions on Aerospace and Electronic Systems", "Sep. 1983", pp. 658-662, vol. AES 19, No. 5, Publisher: IEEE.
M.P. Wylie et al., "The Non-Line of Sight Problem in Mobile Location Estimation", "IEEE 5th International conference on Universal Personal Communications", "Oct. 1996", pp. 827-831, vol. 2, Publisher: IEEE.
B.Yang, "Projection Approximation Subspace Tracking", "IEEE Transaction on Signal Processing", "Jan. 1995", pp. 95-107, vol. 43, No. 1, Publisher: IEEE.
Y.Zhao, "Standardization of Mobile Phone Positioning for 3G Systems", "Communications Magazine", "Jul. 2002", pp. 108-116, vol. 40, No. 7, Publisher: IEEE.
Ziskind et al., "Maximum Likelihood Localization of Multiple Sources by Alternating Projection", "IEEE Transactions on Acoustics, Speech, and Signal Processing", "Oct. 1988", pp. 1553-1560, vol. 36, No. 10, Publisher: IEEE.
Wax et al., "On Unique Localization of Multiple Sources by Passive Sensor Arrays", "IEEE Transactions on Acoustics, Speech, and Signal Processing", "Jul. 1989", pp. 996-1000, vol. 37, No. 7, Publisher: IEEE.

AUTONOMOUS TRANSMIT CHAIN DELAY MEASUREMENTS

CROSS REFERENCES

The present application is a divisional of U.S. application Ser. No. 13/740,643 filed on Jan. 14, 2013, and entitled "AUTONOMOUS TRANSMIT CHAIN DELAY MEASUREMENTS," which claims the priority benefit of the provisional application entitled, "Autonomous Transmit Chain Delay Measurements," Application Ser. No. 61/585,681, filed on Jan. 12, 2012, wherein the contents of all of the foregoing applications are hereby incorporated by reference.

BACKGROUND

The location of a mobile, wireless or wired device is a useful and sometimes necessary part of many services. The precise methods used to determine location are generally dependent on the type of access network and the information that can be obtained from the device. For example, in wireless networks, a range of technologies may be applied for location determination, the most basic of which uses the location of the radio transmitter as an approximation.

Exemplary wireless networks may be a World Interoperability for Microwave Access ("WiMAX") network, a Long Term Evolution ("LTE") network, and the like. Generally, WiMAX is intended to reduce the barriers to widespread broadband access deployment with standards-compliant wireless solutions engineered to deliver ubiquitous fixed and mobile services such as VoIP, messaging, video, streaming media, and other IP traffic. LTE is generally a 4G wireless technology and is considered the next in line in the Global System for Mobile Communication ("GSM") evolution path after Universal Mobile Telecommunications System ("UMTS")/High-Speed Downlink Packet Access ("HSPDA") 3G technologies. LTE builds on the 3GPP family including GSM, General Packet Radio Service ("GPRS"), Enhanced Data Rate for Global Evolution ("EDGE"), Wideband Code Division Multiple Access ("WCDMA"), High Speed Packet Access ("HSPA"), etc., and is an all-IP standard like WiMAX. LTE is based on orthogonal frequency division multiplexing ("OFDM") Radio Access technology and multiple input multiple output ("MIMO") antenna technology. LTE provides higher data transmission rates while efficiently utilizing the spectrum thereby supporting a multitude of subscribers than is possible with pre-40 spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 40 network and the Internet seamlessly. While LTE protocol is being defined in the 3GPP standards as the next generation mobile broadband technology, there is a need for mobile subscriber or user equipment ("UE") location in exemplary networks for compliance with the FCC E-911 requirements and for other location based services. The 3GPP standards have also identified different methods that could be used for positioning of an UE for an evolved-UMTS Terrestrial Radio Access Network ("E-UTRAN").

A number of applications currently exist within conventional communication systems, such as those supporting OSM, Time Division Multiple Access ("TDMA"), Code Division Multiple Access ("CDMA"), Orthogonal Frequency Division Multiple Access ("OFDMA") and UMTS technologies, for which location solutions are needed by mobile units, mobile stations, UE or other devices and by other entities in a wireless network. Examples of such applications may include, but are not limited to, GPS positioning and assisted global position system ("A-GPS") positioning. A-GPS adaptable UE may acquire and measure signals from a number of satellites to obtain an accurate estimate of the DE's current geographic position. GPS-based solutions may offer excellent accuracy, but GPS-based solutions generally suffer from yield issues in indoor environments or in environments that provide a poor line of sight to the open sky in which to best receive GPS satellite transmissions. Furthermore, embedding GPS chipsets into UE may also add an associated cost to the manufacturing of the UE and an associated cost to A-GPS functionality in the respective communications network. There, however, exists a need in the art to locate UMTS, OFDMA or W-CDMA mobile devices to satisfy FCC E-911 regulations as well as to provide Location Based Services for mobile phone users.

The 3GPP UMTS standard outlines several methods for location including Cell-ID, Enhanced Cell-ID ("E-CID"), A-GPS, Observed Time Difference of Arrival ("OTDOA"), and Uplink Time Difference of Arrival ("U-TDOA"). Cell-ID generally is the simplest method which provides coarse positioning of mobile devices based on a known location of the coverage area centroid of each base station sector. Additionally, A-GPS is a straightforward implementation for network and handset manufacturers due to their legacy in CDMA2000 networks. Likewise, U-TDOA is also a straightforward technique for those skilled in the art and has been widely deployed for other air standards. OTDOA may be confronted with significant implementation challenges for network carriers, due to the fact that the base station timing relationships must be known, or measured, for this technique to be viable.

Some prior art systems are mobile appliance-based and determine the position of the mobile appliance by receiving multiple dedicated location signals either from components outside the mobile appliance's communication system, such as satellites and GPS systems or from a network of dedicated land-based antennas. Other prior art geolocation systems that are network overlay, or infrastructure-based, systems use combinations of specific, as opposed to ambiguous, measurements generally from multiple base stations, such as AOA, TOA and TDOA. These specific measurement values may be utilized to solve a set of mathematical equations to determine the location of the mobile appliance.

There is, however, a need in the art to obviate the deficiencies in the prior art and provide methods that use uplink and/or downlink signal measurements in an exemplary communications network, such as, but not limited to, a UMTS, an LTE network, etc. There is also a need in the art to provide the core measurements necessary for OTDOA positioning methods while attaining the accuracy standards that meet FCC Phase I and II requirements.

SUMMARY

Embodiments of the present subject matter may thus provide a system and method to autonomously measure signal delay in the transmission path between a baseband processing unit and antenna. Hence, embodiments of the present subject matter may measure the transmission time of downlink signals from the cell site antenna. Such an autonomous measuring technique may permit quick deployment of an exemplary OTDOA system for positioning of a mobile device or UE.

In some embodiments of the present subject matter a method of determining transmission delay in a communications system is provided. Satellite positioning information may be received for a mobile device, and E-CID positioning information received for the mobile device. A location of the mobile device may then be determined as a function of the received satellite positioning information. Transmission delay between a node serving the mobile device and an antenna serving the mobile device may then be determined as a function of the received E-CID positioning information and the determined location of the mobile device.

In other embodiments of the present subject matter a method of determining transmission delay in a communications network having a plurality of nodes is provided. The method may include receiving satellite positioning information for a mobile device, the received satellite positioning information including System Frame Number (SFN) information and receiving OTDOA measurements for a mobile device from one or more of the plural nodes. A location of the mobile device may be determined as a function of the received satellite positioning information, and a Global Positioning System (GPS) time estimate determined as a function of the determined location of the mobile device. Transmission delay between a node serving the mobile device and an antenna serving the mobile device may then be determined as a function of the received OTDOA measurements and determined GPS time estimate.

DETAILED DESCRIPTION

With reference to the figures, where like elements have been given like numerical designations to facilitate an understanding of the present subject matter, the various embodiments for autonomous transmit chain delay measurements are described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof. The terms "device," "handset," "terminal," and "station" are utilized interchangeably through the present disclosure and such use is not intended to limit the scope of the claims appended herewith. It should also be noted that the terms "node(s)" and "site(s)" and "station(s)" are also utilized interchangeably through the present disclosure and such use is not intended to limit the scope of the claims appended herewith.

Generally, LCS methods are accomplished through Control Plane ("CoP") or User Plane ("UP") methods. CoP Location ("CoPL") refers to using the control signaling channel within the network to provide location information of the subscriber or UE. UP Location ("UPL"), such as Secure User Plane Location ("SUPL") uses the user data channel to provide location information. CoPL location approaches include, but are not limited to, Angle-of-Arrival ("AOA"), Observed Time-Difference-of-Arrival ("OTDOA"), Observed-Time-Difference ("OTD"), Enhanced-OTD ("E-OTD"), Enhanced Cell-ID ("E-CID"), A-GPS, and A-GNSS. UPL approaches include, but are not limited to, A-GPS, A-GNS S, and E-CID, where this position data is communicated over IP.

There are two established architectures associated with location determination in modem cellular networks. These architectures are CoP and UP architectures. Typically, location requests are sent to a network through a query gateway function, and depending on the network implementation, CoP or UP may be used. The difference between user plane and control plane, generally, is that the former uses the communication bearer established with the device in order to communicate measurements. The latter uses the native signaling channels supported by the controlling network elements of the core and access to communicate measurements. For example, a CoPL solution supporting A-GPS would use its control plane signaling interfaces to communicate GPS data to/from the handset. Similarly UPL can conduct E-OTD, i.e., the handset takes the timing measurements but it communicates them to the location platform using the data bearer. UPL has the advantage of not depending on specific access technology to communicate measurement information. CoPL has the advantage that it can access and communicate measurements which may not be available to the device. Current models generally require network operators to deploy one or the other, CoPL or UPL. CoPL generally uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for performing location procedures. CoPL can utilize measurements made by both the control plane network elements as well as the end-user device being located.

Figure 1A:
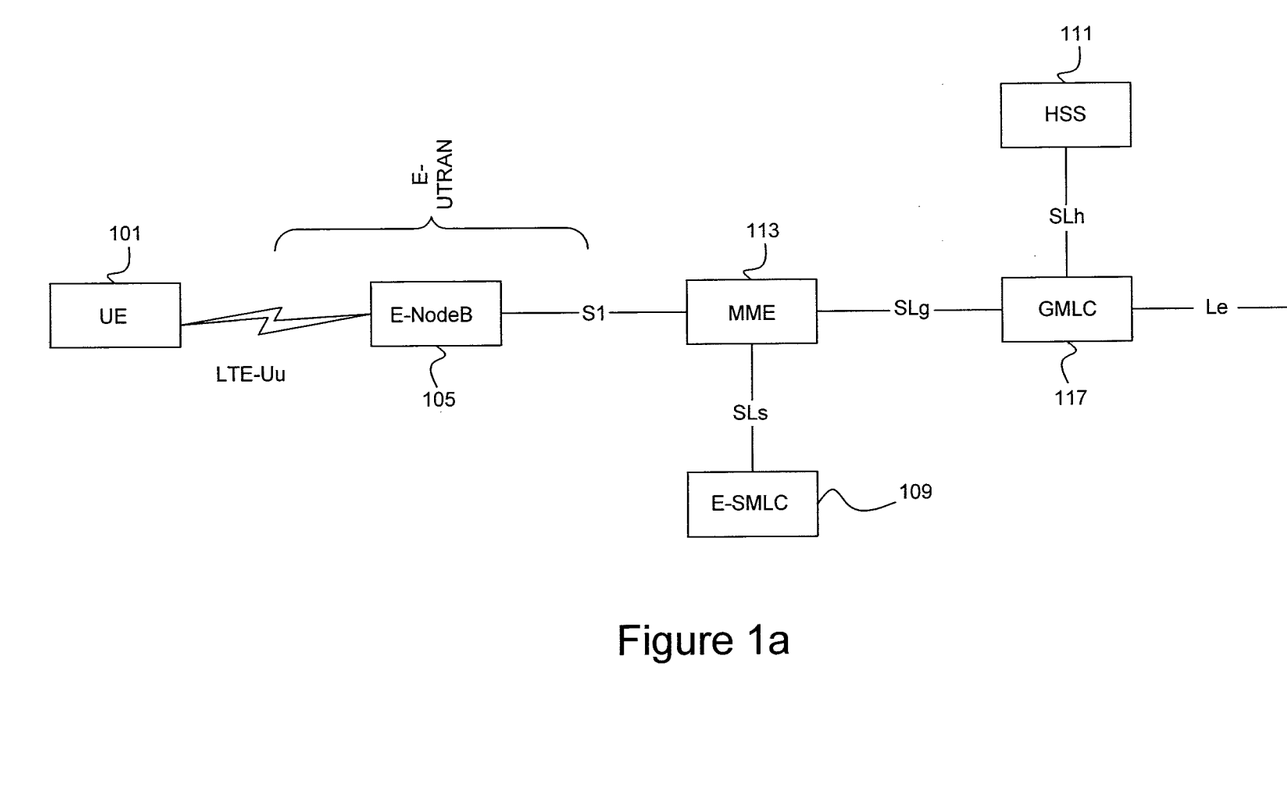
FIG. 1A is an illustration of an exemplary architectural diagram for CoPL.

FIG. 1A illustrates an exemplary architectural diagram of CoPL. A mobile station or mobile appliance 101 communicates with an E-NodeB 105 via wireless interface LTE-Uu. A mobility management entity ("MME") 113 coordinates between the mobile appliance communication network and a gateway mobile location center ("GMLC") 117. In operation, a location measurement device (not shown) may be connected to the E-NodeB 105 and make measurements on the RF signals of the LTE-Uu interface, along with other measurements to support one or more of the position methods associated with the CoPL. Measurements from the location measurement units are sent to a serving mobile location center ("SMLC") or Evolved-SMLC ("E-SMLC") 109 where the location of a mobile appliance/UE 101 can be determined. The GMLC 117 may be connected to a home subscriber server ("HSS") 111 over an SLh interface.

Figure 1B:
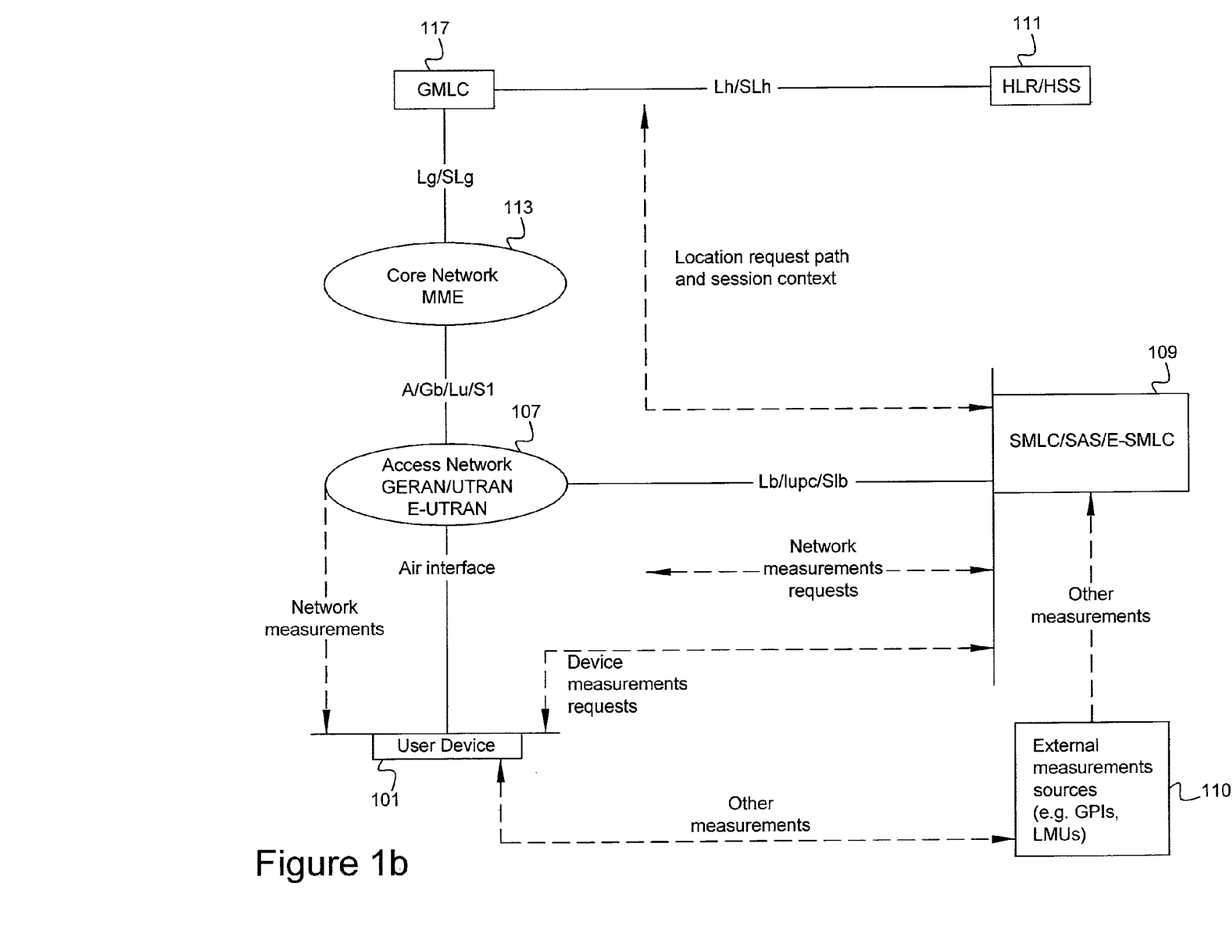
FIG. 1B is an illustration of the operation of an exemplary CoPL architecture.

The operation of a CoPL architecture is shown in FIG. 1B. This shows the 3GPP location services architecture. A gateway mobile location centre ("GMLC") 117 may be the network element that receives the location requests. The GMLC queries the HLR/HSS 111 over the Lh/SLh interface to find out which part of the access network 107 is currently serving the target device. The GMLC 117 sends a location request to the current serving core network node 113 via the Lg/SLg interface. The current serving core network node 113 (e.g., MME) then passes the request to the part of the access network 107 attached to the target device (e.g., GERAN BSC, UTRAN RNC or E-UTRAN RNC). This access network element 107 then invokes the facilities of the SMLC/SAS/E-SMLC 109. The location request session between the access network node 107 and the SMLC/SAS/E-SMLC 109 provides a channel by which the SMLC/SAS/E-SMLC 109 can ask for network measurements or to send messages to the end-user device 101 so that device measurement information can be exchanged. The SMLC/SAS/E-SMLC 109 may also obtain location measurement information from external devices 110 such as location measurement units ("LMUs") which take RF readings from the air interface. Similarly, the device may also take measurements from external systems, such as GPS satellites, and communicate these to the SMLC/SAS/E-SMLC 109.

The E-SMLC may generally be a serving location node defined by 3GPP and is analogous to the GERAN-SMLC and UTRAN-SAS. The E-SMLC hosts position calculation functions and may be responsible for the overall coordination of a location request including selecting appropriate positioning technologies based on the requested quality of service (accuracy, response time), interacting with the mobile appliance and access network to serve assistance data and obtain appliance and network based measurements, providing the position calculation function, fallback positioning in case the primary location technique of choice fails, and generally assuring that a location result may be provided back to the tasking entity. Thus, the E-SMLC may generally support the interface to the MME in accordance with 3GPP protocol specifications, support multiple positioning technologies including Cell ID, E-CID, handset-based and handset-assisted A-GPS/A-GNSS, OTDOA, uplink timing LMU technology, AOA, and hybrid positioning in accordance with emerging standards and the demands of the market.

Developed as an alternative to CoPL, SUPL may generally be a set of standards managed by the Open Mobile Alliance ("OMA") to transfer assistance data and positioning data over IP to aid network and terminal-based positioning technologies in ascertaining the position of a SUPL Enabled Terminal ("SET"). UPL does not explicitly utilize the control plane infrastructure. Instead, UPL assumes that a data bearer plane may be available between the location platform and the end-user device. That is, a control plane infrastructure may have been involved in establishing the data bearer so that communication can occur with the device but no location-specific procedural signaling occurs over the control plane. As such, UPL may be limited to obtaining measurements directly from the end-user device itself.

Figure 2A:
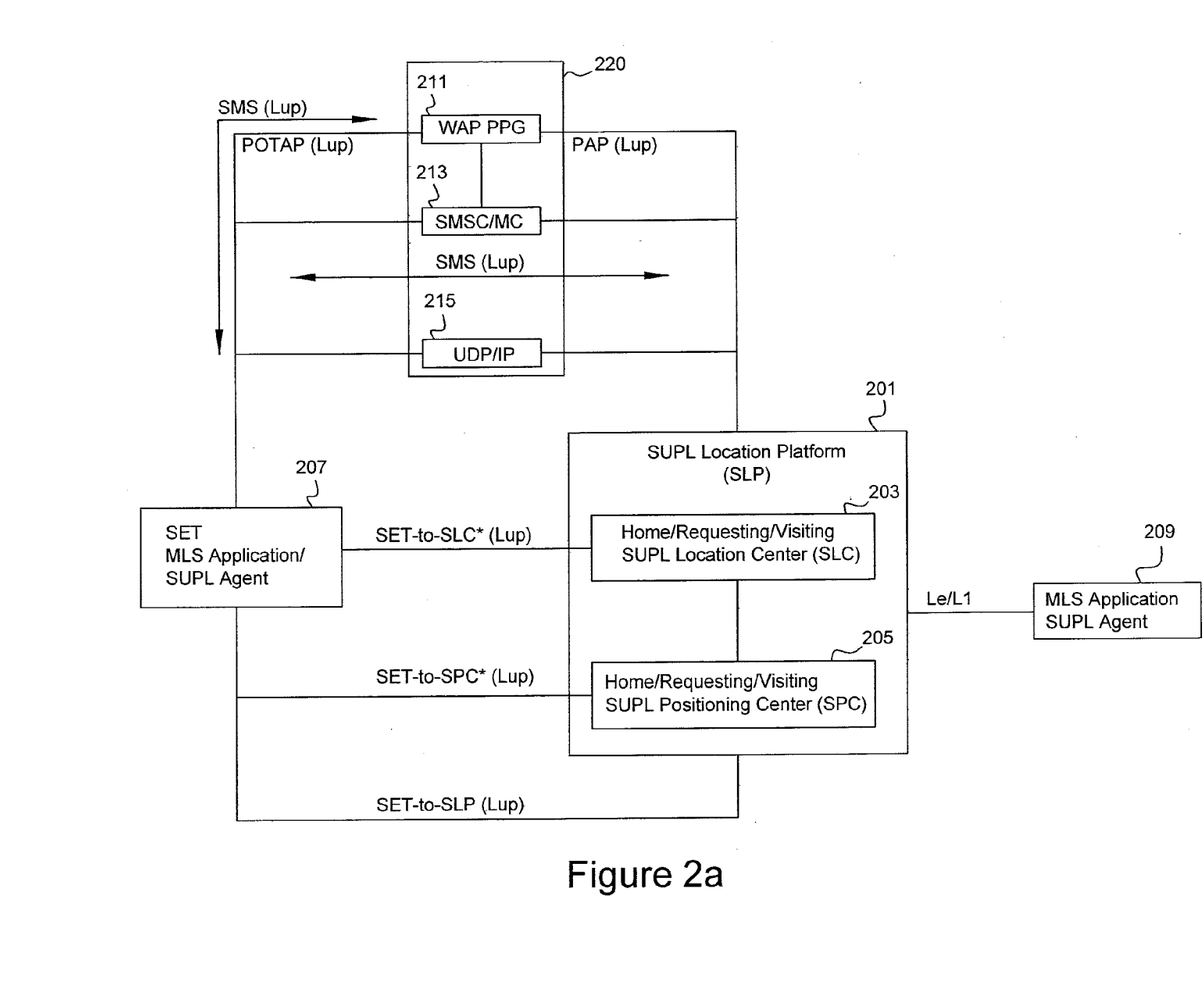
FIG. 2A is an illustration of an exemplary architectural diagram for SUPL.

SUPL includes a Lup reference point, the interface between the SUPL Location Platform ("SLP") and SET, as well as security, authentication, authorization, charging functions, roaming, and privacy functions. For determining position, SUPL generally implements A-GPS, A-GNSS, or similar technology to communicate location data to a designated network node over IP. FIG. 2A illustrates an exemplary architectural diagram for SUPL. The illustrated entities represent a group of functions, and not necessarily separate physical devices. In the SUPL architecture, an SLP 201 and SET 207 are provided. The SLP 201 may include a SUPL Location Center ("SLC") 203 and a SUPL Positioning Center ("SPC") 205. The SLC and SPC may optionally communicate over the Lip interface, for instance, when the SLC and SPC are deployed as separate entities. The SET 207 generally includes a mobile location services ("MLS") application, an application which requests and consumes location information, or a SUPL Agent, a service access point which accesses the network resources to obtain location information.

For any SET, an SLP 201 may perform the role of the home SLP ("H-SLP"), visited SLP ("V-SLP") or emergency SLP ("E-SLP"). An H-SLP for a SET includes the subscription, authentication, and privacy related data for the SET and may generally be associated with a part of the SET's home public land mobile network ("PLMN"). A V-SLP for a SET may be an SLP selected by an H-SLP or E-SLP to assist in positioning thereof and may be associated with or contained in the PLMN serving the SET. The E-SLP may perform positioning in association with emergency services initiated by the SET. The SLC 203 coordinates operations of SUPL in the network and interacts with the SET over the User Plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

Figure 2B:
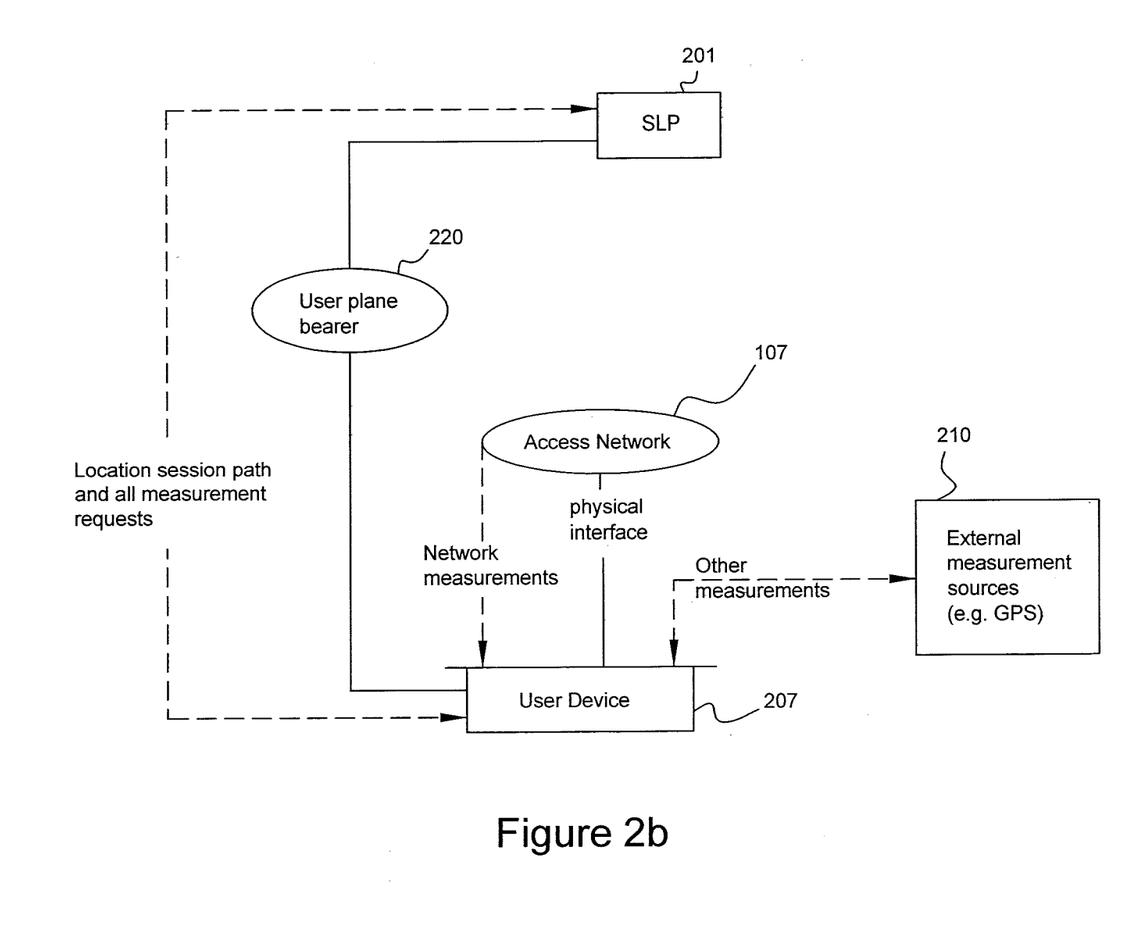
FIG. 2B is an illustration of the operation of an exemplary SUPL architecture.

SUPL session initiation may be network-initiated or SET-initiated. The SUPL architecture provides various alternatives for initiating and facilitating SUPL functions. For example, a SUPL Initiation Function ("SIF") may optionally be initiated using a Wireless Application Protocol Push Proxy Gateway ("WAP PPG") 211, a Short Message Service Center ("SMSC/MC") 213, or a User Datagram Protocol/Internet Protocol ("UDP/IP") 215 core, which forms user plane bearer 220. The operation of UPL is shown in FIG. 2B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer is established between the device 207 and the SLP 201. From then on, the SLP 201 may request measurement information from the device 207. The device may also take measurements from the network 107 or from external systems such as GPS 210. Because there may be no control plane connectivity to the network, the SLP 201 cannot directly request any measurement information from the network 107 itself. More information on SUPL, including the Secure User Plane Location Architecture documentation (OMA-AD-SUPL), can be readily obtained through OMA.

Exemplary downlink positioning techniques and E-CID positioning techniques have been identified as candidates for UE positioning technology for E-UTRAN access. For example, in a downlink positioning technique, the position of a UE may be estimated based upon measurements taken at the UE of downlink radio signals from multiple nodes (e.g., eNodeBs, etc.), along with the knowledge of the geographical coordinates of the measured nodes and their relative downlink timing. In an E-CID positioning technique, knowledge of geographical coordinates of the serving node and additional UE/E-UTRAN radio resource measurements may be employed to estimate the position of a UE. Embodiments of the present subject matter may thus obtain an estimated position of a UE by combining measurements obtained from an exemplary E-CID process and measurements obtained from an exemplary OTDOA process.

3GPP standards have defined the downlink System Frame Number (SFN) initialization time to determine an absolute time of downlink transmission. For example, an SMLC, E-SMLC, or equivalent may receive OTDOA cell information from both the serving and/or reference eNodeB(s) that contain the SFN initialization time. This SFN initialization time may be employed to determine an absolute downlink transmission time of a downlink frame at a cell site antenna by measuring the delay between the time stamping module at the baseband and the transmission antenna.

A downlink SFN initialization time tagging mechanism, however, may occur in the eNodeB. Thus, in many deployment scenarios there may exist a delay in the transmission path between the eNodeB and the cell site antenna due to cables, filters, and/or other passive or active components. Further, such delays in the transmission signal path may also vary among different deployed sites. Transmission time of a downlink Frame Tx_enb$_i$ at the Tx antenna of an nth eNodeB may be provided by the following relationship:

$$Tx\_enb_i = SFN_i + \delta_i \quad (1)$$

where $SFN_i$ represents the SFN initialization time at the $n^{th}$ eNodeB and may be reported under assistance information from the $i^{th}$ eNodeB under the OTDOA cell info Information Element (IE), and $\delta_i$ represents the delay at the $i^{th}$ base station between the respective time stamping module and the transmission cell site antenna.

Exemplary embodiments may determine the delay in the transmission path by using A-GNSS or A-GPS capable UEs, SETs or other mobile devices. Of course, A-GNSS and A-GPS are provided as non-limiting examples, as embodiments of the present subject matter may include other exemplary satellite systems such as, but not limited to, GLONASS, Galileo, Compass, BeiDou and the like.

For example, in one embodiment an E-SMLC or equivalent may initiate network assisted GNSS positioning procedures and/or an E-CID procedure to obtain measurements from the UE associated with the procedure. A delay in the transmission path may be determined based upon Timing Advance (TA) measurements from the E-CID procedure and/or a target location determined from any A-GNSS measurements. Thus, to determine the transmission path delay, the UE(s) position(s) determined by or at the E-SMLC may be paired or associated with respective TA measurements for the UE(s) obtained from the E-CID procedure.

In this embodiment of the present subject matter, both A-GPS/GNSS and E-CID positioning may be invoked from the E-SMLC or SLP. In one embodiment, E-CID positioning may be invoked through the control plane to provide better accuracy, and/or A-GPS/GNSS positioning may be invoked through the SLP to minimize messaging overhead in the control plane. Of course, embodiments of the present subject matter should not be so limited as both the control and user planes may be utilized in embodiments of the present subject matter.

Figure 3:
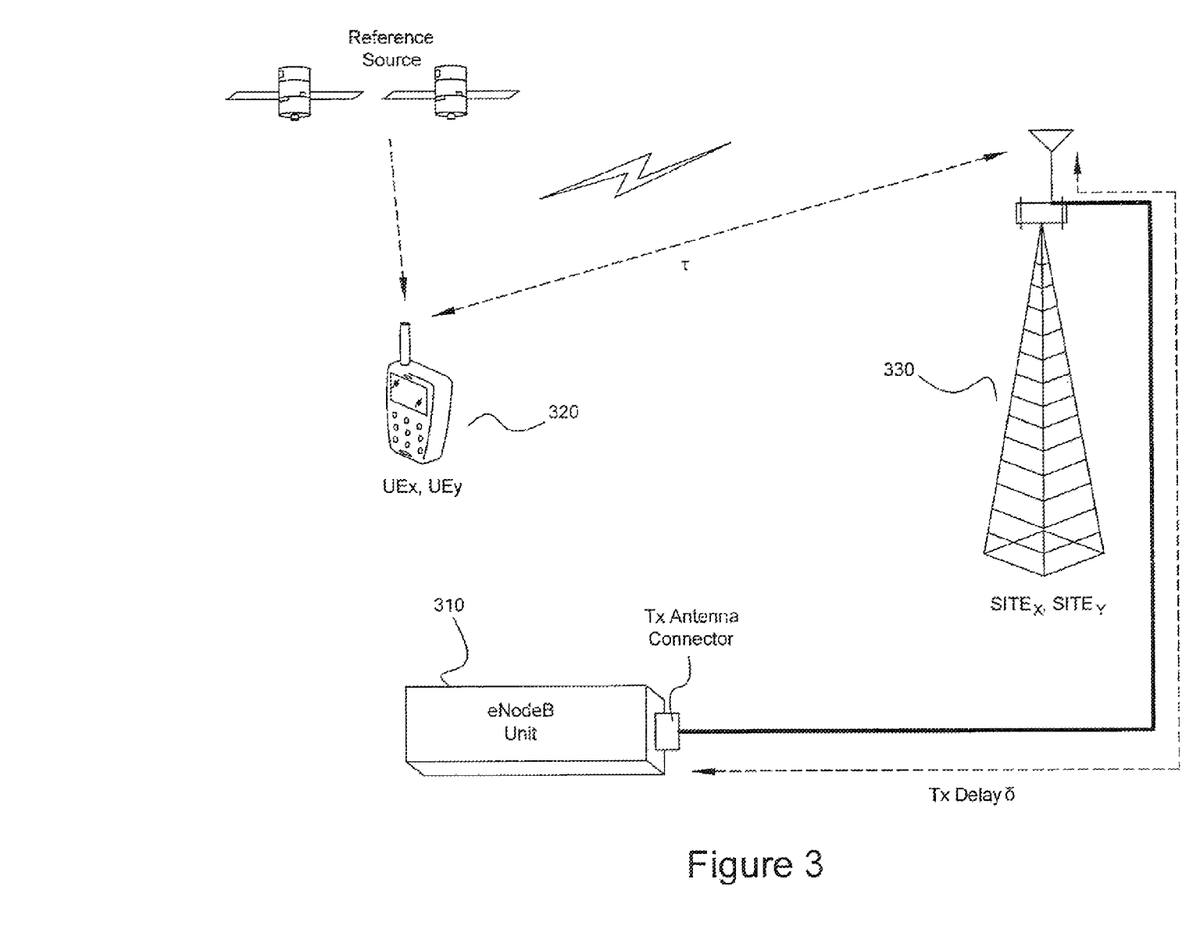
FIG. 3 is an illustration of transmission delay measurement in some embodiments of the present subject matter.

If the position of the UE is determined using an exemplary A-GPS/GNSS positioning method, then the TA received using E-CID may be employed to estimate the delay occurring in the transmission path or of the eNodeB as illustrated in FIG. 3. Further information regarding TA is provided in 3GPP TS 36.214, the entirety of which is incorporated herein by reference. With reference to FIG. 3, using an exemplary uplink E-CID positioning method where measurements may be obtained by the eNodeB 310, an E-SMLC may receive measurement results from the serving eNodeB 310 containing TA for a target UE 320 as illustrated in Figure Ia. As described in 3GPP TS 36.455, the entirety of which is incorporated herein by reference, two types of TA information may be available from eNodeBs. According to 3GPP TS 36.214, TA may be determined at the transmission/receiver (Tx/Rx) antenna connector point of the eNodeB. The TA may account for both the propagation path delay and Rx/Tx path delay. Hence, if one assumes that the delay in the Tx and/or Rx path (i.e., the "transmission" path), 8, between the cell site antenna 330 and eNodeB 310 are both equal, then the following relationship may be obtained:

$$T_{ADV\_type1} = 2*(\tau + \delta) \quad (2)$$

where, $\tau$ represents the propagation delay. Equation (2) may then be rearranged to provide the transmission delay as:

$$\delta = (T_{ADV\_type1})/2 - \tau \quad (3)$$

It should be noted that the asymmetry of delay in the Tx and Rx path due to different size of filters in the RF front end may impact the actual delay but should not impact the relative timing of downlink signals as these asymmetries between the Tx and Rx path or chain may not vary significantly from one base station to the other. Further, in embodiments where an SLP invokes an E-CID positioning procedure, $T_{ADV\_type1}$ may be replaced by the TA received from a SET within an LTE LID.

The propagation delay $\tau$ between the cell site antenna 330 and UE 320 may be determined using knowledge of the position of the UE 320 and the location of the cell site; hence, an A-GPS/A-GNSS capable UE 320 may be used to determine the location of the UE 320. In the absence of TA Type 1, TA Type 2 may also be used. In this embodiment, the transmission delay may be determined using the following relationship:

$$\delta = \frac{1}{2}(T_{ADV\_type2}) - \tau \quad (4)$$

When an E-SMLC, SLP, or other management server or entity desires to characterize the delay in the transmission path or chain for a particular site, a number of GPS/GNSS capable UEs served by that cell may be selected. Thus, the E-SMLC or SLP may invoke A-GNSS and E-CID positioning procedures on the UEs and may retrieve positioning measurements from UE as outlined in 3GPP TS 36.305, 3GPP TS 36.455, and 3GPP TS 36.355, the entirety of each being incorporated herein by reference.

In another embodiment, a delay in the transmission path may be determined from measurements obtained from the A-GNSS positioning procedures and the SFN. Thus, the E-SMLC or equivalent may request the UE to report a GNSS-network-time association when returning A-GNSS signal measurement information. In this embodiment of the present subject matter, an A-GPS/A-GNSS positioning method may be invoked by the E-SMLC or SLP, and the E-SMLC or SLP may receive OTDOA cell information from the serving cell of the UE.

When initiating the A-GNSS method, an exemplary E-SMLC may request the target UE to report GNSS-network time association. The fineTimeAssistanceMeasReq field may be set as TRUE under the IE GNSS-PositioningInstructions as discussed in 3GPP TS 36.355, the entirety of which is incorporated herein by reference. It should be noted that, while not required, the UE may support fine time assistance measurements, as indicated by the field ftaMeasSupport, in the IE A-GNSS-Provide-Capabilities.

Figure 4:
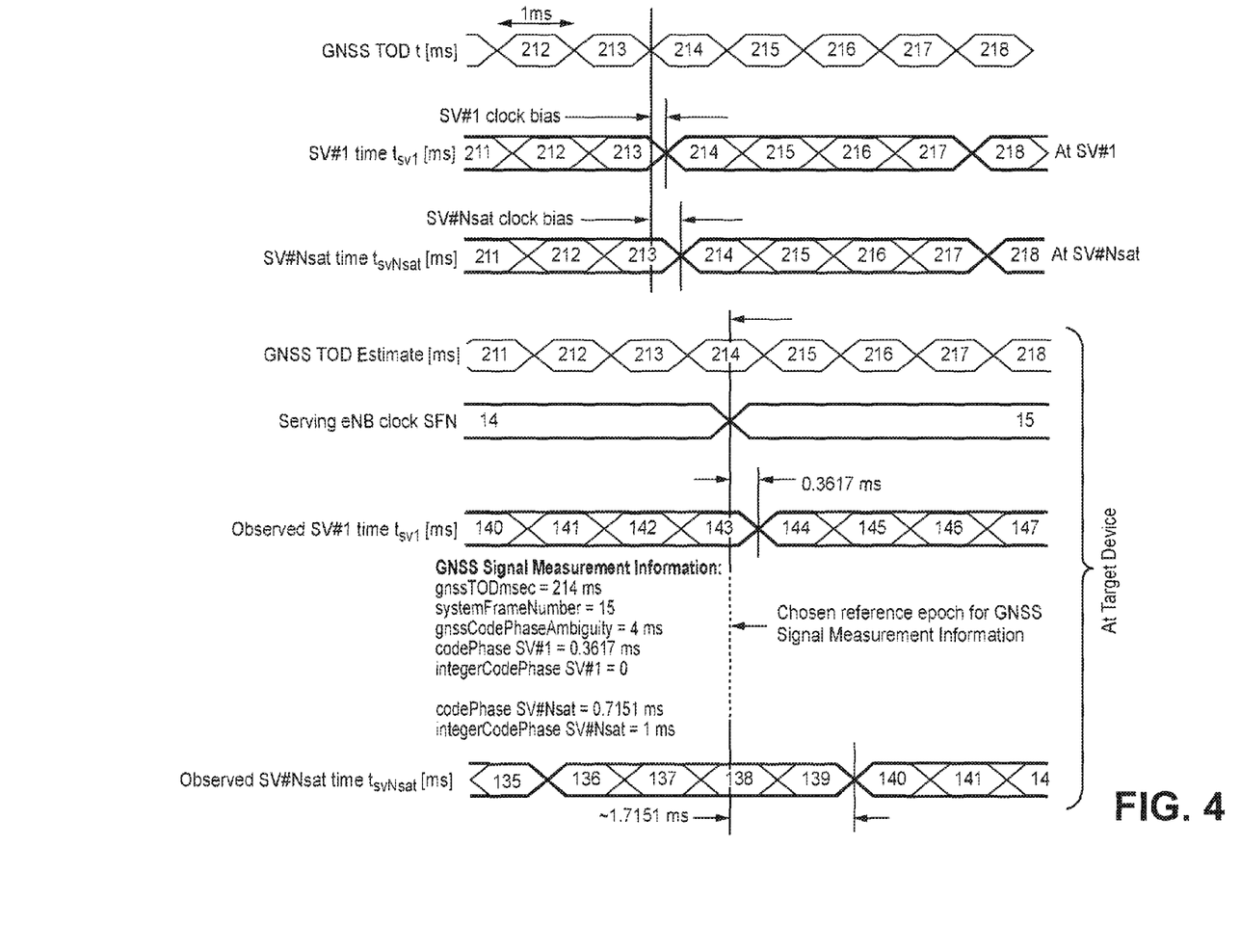
FIG. 4 is diagram of network time boundary alignment for signal measurements according to some embodiments of the present subject matter.

When the E-SMLC indicates fineTimeAssistanceMeasReq, then the UE may align the measurement point with a cellular frame boundary and include the same in the network time (e.g., SFN) so that the GNSS time reported may be the time occurs at the frame boundary. FIG. 4 provides an illustration of such an embodiment. With reference to FIG. 4, precise time may be available after position determination, so the E-SMLC may establish the final GNSS-network time relationship. From the positioning determination of the UE, precise GNSS/GPS time of the SFN boundary observed at the UE may be determined. Assuming that the determined GNSS/GPS time of $SFN_n$ observed at the UE is $UERx^{Nth}_{SFN}$, one may determine the propagation delay τ from the cell site antenna to the UE as a function of the determined location of the UE and the cell site location. If transmission time of the downlink frame N from the $i^{th}$ base station cell site antenna is represented as $Tx\_eNB_i^{Nth\ SFN}$, where i represents the serving base station, the following relationship may be obtained:

$$Tx\_eNB_i^{Nth\ SFN} = UERx^{Nth\ SFN} - \tau \qquad (5)$$

The E-SMLC may also obtain OTDOA cell information of the serving eNodeB including SFN initialization time. The SFN initialization time (in sec relative to 00:00:00 on 1 Jan. 1900) may be translated to GNSS/GPS reference time. Thus, assuming that the translated SFN time is represented as $eNB_i^{SFN\_init}$, if both $eNB_i^{SFN\_init}$ and $Tx\_eNB_i^{Nth\ SFN}$ are expressed in GPS/GNSS time of day (TOD), then the transmission delay may be determined as provided in the relationship below:

$$\delta = Tx\_eNB_i^{Nth\ SFN} - eNB_i^{NFNinit} \qquad (6)$$

To minimize measurement errors, the location of the UE may be obtained from A-GPS/A-GNSS methods by keeping the UE stationary and/or averaging the same over a predetermined number of iterations to minimize UE location error. Tx delay, δ, may thus be obtained by averaging over several times for a stationary UE location. This embodiment may also be repeated by placing UE(s) distributed over the cell area to minimize any bias from a particular location.

Thus, embodiments of the present subject matter may provide a method of determining delay using a mobile device's location and a respective signal's propagation delay. Such delay may include cable and/or other RF component delays. Further, the propagation delay may be either uplink and/or downlink paths and may be averaged for better accuracy.

Figure 5:
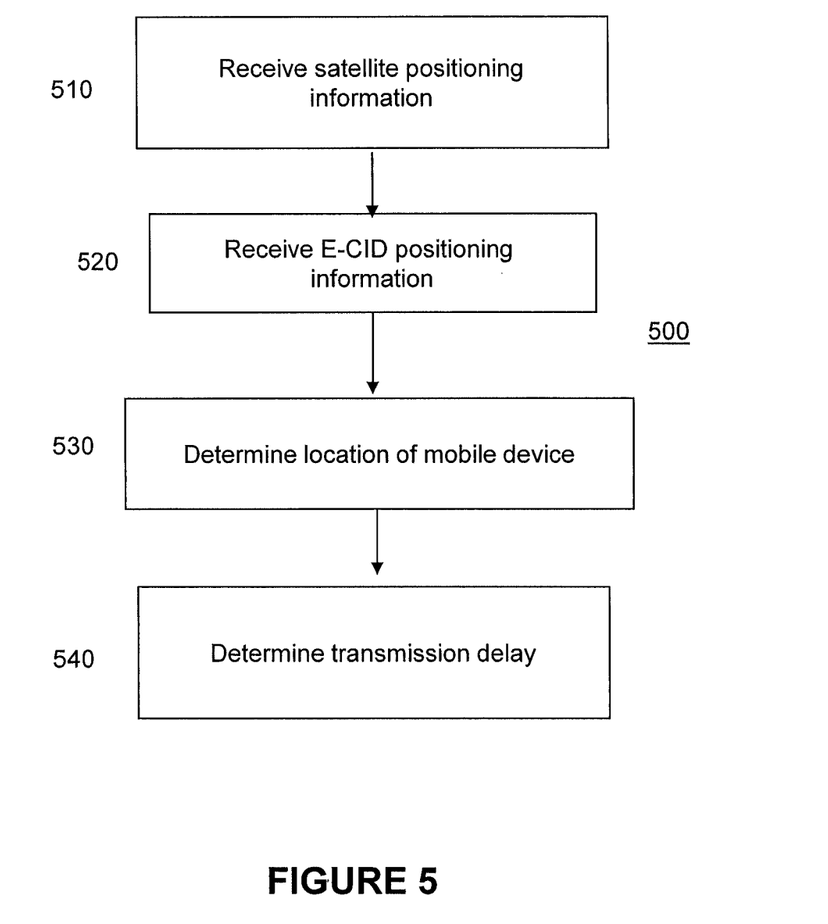
FIG. 5 is a diagram of one embodiment of the present subject matter.

FIG. 5 is a diagram of one embodiment of the present subject matter. With reference to FIG. 5, a method 500 of determining transmission delay in a communications system is provided. At step 510, the method may include receiving satellite positioning information for a mobile device. At step 520, E-CID positioning information may be received for the mobile device. In some embodiments, the received E-CID positioning information may include timing advance information of an uplink signal transmitted from the mobile device or timing advance information of a downlink signal received by the mobile device. In other embodiments, the E-CID positioning measurements may include timing advance type 1 or timing advance type 2. In yet another embodiment, step 520 may include invoking an E-CID positioning procedure from the UP or from the CoP.

A location of the mobile device may then be determined at step 530 as a function of the received satellite positioning information. At step 540, transmission delay between a node serving the mobile device and an antenna serving the mobile device may be determined as a function of the received E-CID positioning information and the determined location of the mobile device. In an alternative embodiment, step 540 may include determining cable delay and/or radio frequency component delay. In one embodiment, the serving node is an eNodeB. In a further embodiment, the method may include the step of determining propagation delay between the serving antenna and the mobile device as a function of the determined mobile device location and location of the serving antenna, where the determined transmission delay is a function of the determined propagation delay. In such a method, the determined propagation delay may be a function of a transmission path from the mobile device to the serving antenna or from the serving antenna to the mobile device. In additional embodiments, the method may include the step of iteratively repeating step 530 and averaging the determined locations over the several iterations. In an alternative embodiment, the method may include the step of determining a location of one or more other mobile devices using respective received satellite information, whereby step 540 would include determining transmission delay as a function of the determined locations of the one or more other mobile devices to minimize bias from any single location determination.

Figure 6:
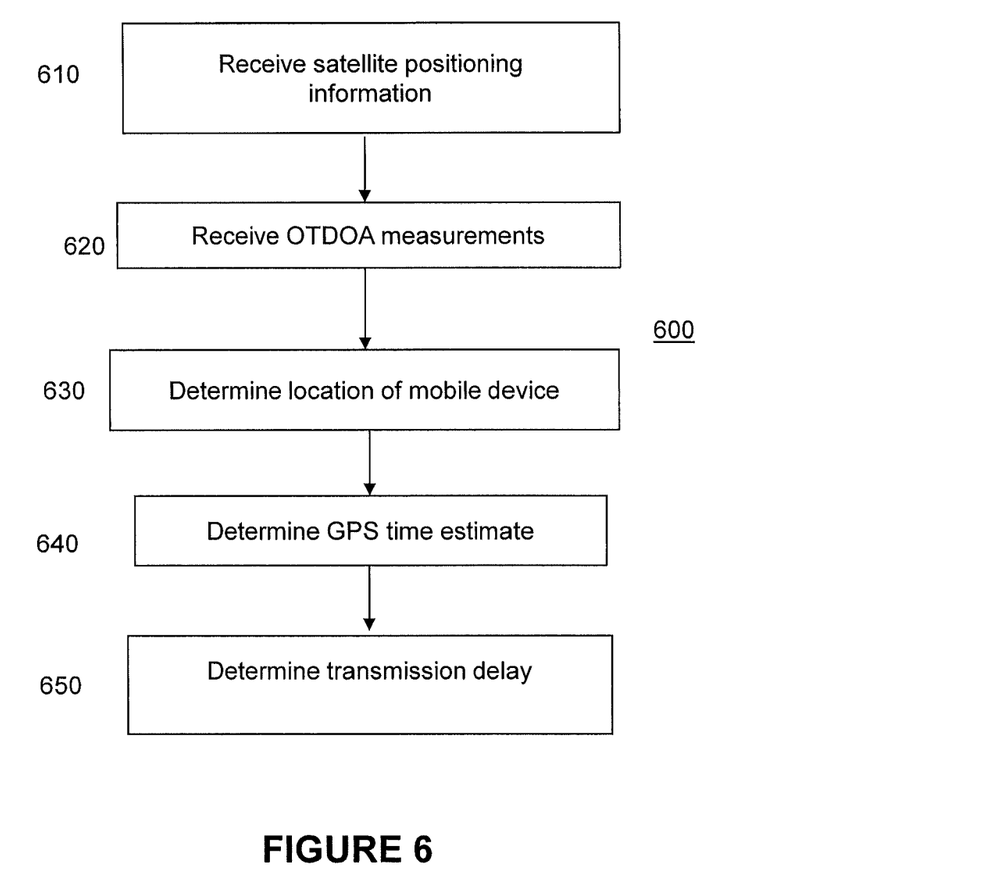
FIG. 6 is a diagram of another embodiment of the present subject matter.

FIG. 6 is a diagram of another embodiment of the present subject matter. With reference to FIG. 6, a method 600 of determining transmission delay in a communications network having a plurality of nodes is provided. The method may include receiving satellite positioning information for a mobile device, the received satellite positioning information including SFN information at step 610 and receiving OTDOA measurements for a mobile device from one or more of the plural nodes at step 620. In one embodiment, step 610 includes requesting the mobile device to report a GPS to network time relationship. In another embodiment, the OTDOA measurements may include SFN initialization time.

A location of the mobile device may be determined as a function of the received satellite positioning information at step 630. At step 640, a GPS time estimate may be determined as a function of the determined location of the mobile device. At step 650, transmission delay between a node serving the mobile device and an antenna serving the mobile device may be determined as a function of the received OTDOA measurements and determined GPS time estimate. In one embodiment, the serving node is an eNodeB. In a further embodiment, the method may include the step of determining propagation delay between the serving antenna and the mobile device as a function of the determined mobile device location and location of the serving antenna, where the determined transmission delay is a function of the determined propagation delay. In such a method, the determined propagation delay may be a function of a transmission path from the mobile device to the serving antenna or from the serving antenna to the mobile device. In additional embodiments, the method may include the step of iteratively repeating step 630 and averaging the determined locations over the several iterations. In an alternative embodiment, step 650 may include determining cable delay and/or radio frequency component delay. In an alternative embodiment, the method may include the step of determining a location of one or more other mobile devices using respective received satellite information, whereby step 650 would include determining transmission delay as a function of the determined locations of the one or more other mobile devices to minimize bias from any single location determination.

While the discussion above has referenced certain exemplary networks such as UMTS networks, the disclosure herein should not be so limited. For example, the principles discussed herein are equally applicable to other networks such as, but not limited to, a TDMA network, CDMA network, a WiMax network, a WiFi network, networks utilizing EDVO, a CDMA2000 network, and 1×RTT standards or another equivalent networks or other networks that may include a system clock or equivalent. Such exemplary system clocks may thus be utilized by embodiments of the present subject matter to determine timing relationships relevant herein.

The present disclosure may be implemented by a general purpose computer programmed in accordance with the principals discussed herein. It may be emphasized that the above-described embodiments, particularly any "preferred" or exemplary embodiments, are merely possible examples of implementations, merely set forth for a clear understanding of the principles of the present subject matter. Many variations and modifications may be made to the above-described embodiments of the present subject matter without departing substantially from the spirit and principles of the present subject matter. All such modifications and variations are intended to be included herein within the scope of this present subject matter.

Embodiments of the subject matter and the functional operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

Embodiments of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

The present subject matter may thus provide a method and system for determining the delay in the transmission path to allow for appropriate deployments of an exemplary OTDOA system.

As shown by the various configurations and embodiments illustrated in FIGS. 1-6, various embodiments for autonomous transmit chain delay measurements have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of determining transmission delay in a communications network having a plurality of nodes comprising the steps of:
    (a) receiving satellite positioning information for a mobile device, the received satellite positioning information including System Frame Number (SFN) information;
    (b) receiving observed time difference of arrival (OTDOA) measurements for a mobile device from one or more of the plural nodes;
    (c) determining a location of the mobile device as a function of the received satellite positioning information;
    (d) determining a Global Positioning System (GPS) time estimate as a function of the determined location of the mobile device; and
    (e) determining transmission delay between a node serving the mobile device and an antenna serving the mobile device as a function of the received OTDOA measurements and determined GPS time estimate.

2. The method of claim 1 wherein the step of receiving satellite positioning information further comprises requesting the mobile device to report a GPS to network time relationship.

3. The method of claim 1 wherein the serving node is an eNodeB.

4. The method of claim 1 wherein the OTDOA measurements include SFN initialization time.

5. The method of claim 1 further comprising the step of determining propagation delay between the serving antenna and the mobile device as a function of the determined mobile device location and location of the serving antenna, wherein the determined transmission delay is a function of the determined propagation delay.

6. The method of claim 5 wherein the determined propagation delay is a function of a transmission path from the mobile device to the serving antenna or from the serving antenna to the mobile device.

7. The method of claim 1 wherein the step of determining transmission delay further comprises determining cable delay and/or radio frequency component delay.

8. The method of claim 1 further comprising the step of iteratively repeating step (c) and averaging the determined locations over the iteration.

9. The method of claim 1 further comprising the step of determining a location of one or more other mobile devices using respective received satellite information, wherein the step of determining transmission delay comprises determining transmission delay as a function of the determined locations of the one or more other mobile devices to minimize bias.

* * * * *